United States Patent [19]
Shimizu

[11] Patent Number: 5,091,934
[45] Date of Patent: Feb. 25, 1992

[54] TONE MODIFICATION SYSTEM FOR TELEPHONE SYSTEM WITH CLOCK

[75] Inventor: Yoshiyuki Shimizu, Higashihiroshima, Japan

[73] Assignee: Sharp Kabushiki Kaisha, Osaka, Japan

[21] Appl. No.: 507,678

[22] Filed: Apr. 10, 1990

[30] Foreign Application Priority Data

Apr. 10, 1989 [JP] Japan ............................ 1-42388[U]
Jun. 2, 1989 [JP] Japan ............................ 1-65027[U]

[51] Int. Cl.⁵ .................................................. H04M 1/00
[52] U.S. Cl. ........................................ 379/418; 379/190; 379/393
[58] Field of Search ............... 379/190, 215, 393, 418, 379/375

[56] References Cited

U.S. PATENT DOCUMENTS

| | | | |
|---|---|---|---|
| 4,631,361 | 12/1986 | Miller | 379/418 X |
| 4,651,339 | 3/1987 | Gibbs | 379/418 X |
| 4,674,118 | 6/1987 | Tosto | 379/393 |
| 4,834,551 | 5/1989 | Katz | 379/393 X |
| 4,866,587 | 9/1989 | Wadlington | 379/418 X |

FOREIGN PATENT DOCUMENTS

| | | | |
|---|---|---|---|
| 0001398 | 1/1987 | Japan | 379/190 |
| 0095060 | 5/1987 | Japan | 379/190 |
| 63-272250 | 11/1988 | Japan | . |
| 0023793 | 1/1990 | Japan | 379/190 |

Primary Examiner—James L. Dwyer
Assistant Examiner—M. Shehata
Attorney, Agent, or Firm—David G. Conlin; Robert M. Asher

[57] ABSTRACT

A telephone system with a clock includes a circuit which produces a first tone indicating a connection of a transmission line is on hold or that a preset time has arrived, and a different time announcing tone for announcing the arrival of the preset time while the connection of the transmission line is on hold. When a calling tone is to be produced upon reception of the call while the time announcing tone is emitted, the telephone system with the clock produces the calling tone in a manner different from the time announcing tone. Thus, it is possible to be alerted to both the time announcing tone and the holding tone and both the time announcing tone and the calling tone when either combination is initiated at the same time.

5 Claims, 3 Drawing Sheets

TONE MODIFICATION SYSTEM FOR TELEPHONE SYSTEM WITH CLOCK

BACKGROUND OF THE INVENTION

1. Field of the Invention

The present invention relates to a telephone system with a clock and more particularly to a telephone system with a clock which produces a time announcing tone at a preset time.

2. Description of the Background Art

A conventional telephone system with a clock capable of setting a desired time comprises, in addition to a telephone generally used, a hold state setting circuit for putting a connection over a transmission line on hold, a clock, a time setting key for setting a time, a circuit for detecting the set time, and a tone generator which generates a tone for announcing the hold state or the time when the hold state is set or the set time arrives.

In the above described telephone system with the clock, if the user operates the time setting key to set a desired time, the time detecting circuit automatically detects the set time when the set time arrives and in response to the detection output the tone generator generates a time announcing tone. This makes sure that the user is informed of the arrival of the set time to do a prescribed thing, for example, to make a call to a certain person.

However, the above described conventional telephone system involves a disadvantage that if the set time arrives while the connection state of the transmission line is on hold, it is not possible to inform the user of the arrival of the set time since the tone announcing the arrival of the set time and the tone indicating the hold state are identical. Accordingly, it might happen that the user has forgotten to do the scheduled thing at the desired time and for example the user can not leave a message to a specified person. In addition, also in the case where the hold state is set and the holding tone is generated while the time announcing tone is emitted, the user can not determine whether the generated tone is the time announcing tone or the hold state indicating tone.

If a call is received and a calling tone is emitted while the time announcing tone is emitted at the arrival of the set time, the time announcing tone and the calling tone overlap, making it difficult for the user to be aware of the reception of the call.

SUMMARY OF THE INVENTION

Therefore, an object of the present invention is to solve a problem of confusion in simultaneous occurrence of a plurality of tones in a telephone system which has a plurality of functions and produces tones based on those functions.

Another object of the present invention is to provide a telephone system having a clock which can prevent confusion in simultaneous occurrence of a tone indicating a hold state and a tone indicating arrival of a set time.

Still another object of the present invention is to provide a telephone system having a clock which can reliably announce arrival of a set time while a connection state of a transmission line is on hold.

A further object of the present invention is to provide a telephone system having a clock which can reliably announce arrival of a set time and setting of a hold state if the hold state is set while a time announcing tone is emitted.

Another aspect of the present invention is to provide a telephone system having a clock which can reliably announce a calling tone when a call is received while a set time announcing tone is emitted.

Briefly stated, the invention includes a telephone system which includes a transmitter connected to a transmission line for transmitting a communication signal to the transmission line, and a receiver for receiving the communication signal from the transmission line. This telephone system generates a tone when a connection between the system and the transmission line is put on hold, and generates a tone on arrival of a preset time. Those tones are produced differently when the set time arrives while the connection is on hold or when the hold state is set during the arrival of the set time.

According to another aspect of the invention, the invention includes a communication unit which includes a transmitter connected to a transmission line for transmitting a communication signal to the transmission line and a receiver for receiving the communication signal from the transmission line. The communication unit generates a tone at a preset time and generates a tone in response to reception of a call from the transmission line. Those tones are made different when a call is received during the arrival of the preset time.

According to the present invention, either a first tone or a second tone for announcing a hold state is produced in a state of connection with the transmission line. When a preset time arrives in this hold state, the already produced tone and the other tone are outputted to make it possible to reliably announce the arrival of the preset time even in the hold state.

If the transmission line is connected to be in a hold state while a first tone is produced as a time announcing tone on arrival of a preset time, a second tone different from the first tone is produced as the time announcing tone, whereby it is possible to reliably inform the user of the hold state and the arrival of the preset time.

According to a further aspect of the present invention, if a call is received while a first tone as a time announcing tone is produced on arrival of a preset time, the time announcing tone is changed to make it possible for the user to reliably catch the calling tone.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
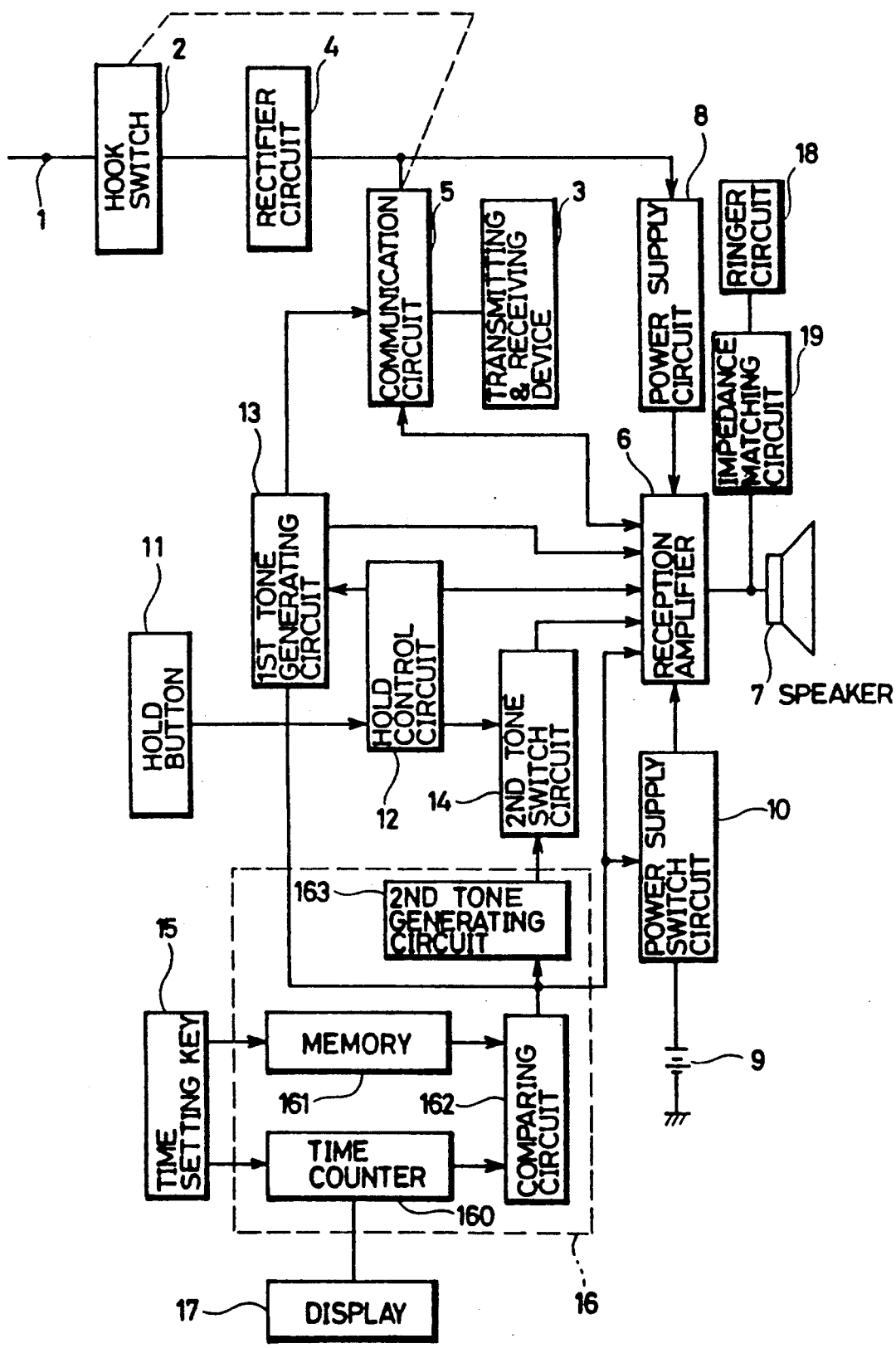
FIG. 1 is a schematic block diagram showing an embodiment of the present invention.

FIG. 1 is a schematic block diagram showing an embodiment of the present invention. Referring to FIG. 1, a transmission line is connected to an exchanger (not shown) in a telephone exchange station. A wire telephone line is used as the transmission line 1 in this embodiment. However, a wireless line may be used. A hook switch 2 is connected to the transmission line 1. The hook switch 2 forms a direct current (DC) loop with the telephone exchanger when the user picks up a telephone handset 3. A rectifier circuit 4 renders constant the polarity of DC power supplied from the hook switch 2. An output of the rectifier circuit 4 is supplied to a communication line 5.

The handset 3 is a transmitting and receiving device which contains a speaker for converting a received signal to a sound and a microphone for converting a content of communication to an electric signal.

The communication circuit 5 regulates the levels of a transmission signal, a reception signal and the like between the handset 3 and the transmission line 1.

If the user wants to transmit a communication without using the handset 3, the reception signal from the communication circuit 5 is supplied to a reception amplifier 6 by using a button (not shown). The reception amplifier 6 amplifies the reception signal from the communication circuit 5 and supplies the output to the speaker 7. The speaker 7 converts the amplified reception signal to a sound.

The DC voltage rectified by the rectifier circuit 4 is also supplied to a power supply circuit 8. The power supply circuit 8 supplies the DC voltage to respective components in the telephone system. An internal power supply 9 applies a voltage constantly to a microcomputer 16 to be described afterwards. When the handset 3 is placed on the hook switch 2, that is, in an on-hook state, the internal power supply 9 supplies voltage to the respective components in the system in substitution for the power supply line 8. A power supply switch circuit 10 is closed in response to the on-hook state and connects the respective components in the system to the internal power supply 9. A hold button 11 is used to keep the person on the other side waiting for a moment. An operation signal of the hold button 11 is supplied to a hold control circuit 12. The hold control circuit 12 sets a connection state of the transmission line 1 in response to the operation of the hold button 11 and drives a first tone generating circuit 13. The hold control circuit 12 drives a switch circuit 14 to turn on the circuit 14. The first tone generating circuit 13 generates a first tone signal for announcing the connection state of the transmission line to the communication circuit 5.

The first tone signal supplied to the communication circuit 5 is transmitted through the rectifier circuit 4 and the hook switch 2 to the transmission line 1. The first tone signal supplied to the communication circuit 5 is also supplied to the reception amplifier 6, which amplifies the first tone signal and supplies the output to the speaker 7. The speaker 7 converts the first tone signal to a sound.

A time setting key 15 is provided to enter a time desired by the user into the microcomputer 16.

The microcomputer 16 comprises a time counter 160 for counting clock pulses and outputting a present time signal, a memory 161, a comparing circuit 162, and a second tone generating circuit 163. The microcomputer 16 maintains the set time in the memory 161 in response to a key operation by the user. The comparing circuit 162 compares the time signal from the time counter 160 with a signal of the set time from the memory 161 and when both signals coincide, it supplies an operation start instruction signal to the second tone generating circuit 163, the switch circuit 14, the power supply switch circuit 10 and the first tone generating circuit 13. A display 17 displays the present time or a content of a memorandum of the user (such as a telephone number of the person to which a call is to be made) in response to a signal from the time counter 160.

A ringer circuit 18 generates a calling tone signal in response to a call reception signal from the transmission line 1. The calling tone signal is provided at prescribed intervals (on for about one second and off for two seconds).

An impedance matching circuit 19 matches the calling tone signal from the circuit 18 with an input impedance of the speaker 7.

Now, operation of the telephone system with the clock having the construction shown in FIG. 1 will be described. For the purpose of setting a time, the user operates the time setting key 15 to enter a desired time. In response to this key operation, the microcomputer 16 stores the set time in the memory 161.

(1) Operation until arrival of the set time

First of all, when the handset 3 is picked up upon reception of a call, the hook switch 2 is closed, so that DC voltage is applied from the transmission line 1 to the power supply line 8 through the rectifier circuit 4. The power supply line 8 drives the respective components in the system to enable a communication. In this case, if the user wants to communicate by using a microphone (not shown) and the speaker 7 as required in place of the handset 3, the reception amplifier 6 is driven by switch operation and the reception signal transmitted from the transmission line 1 is converted to a sound by the speaker 7. A communication to be transmitted is converted to a transmission signal by the microphone and it is applied to the transmission line 1 through the communication line 5, the rectifier circuit 4 and the hook switch 2.

When the hold button 11 is operated to put a connection on hold, the connection state of the transmission line 1 is set by the hold control circuit 12 and an off-switch state is set even if the handset 3 is put back. The hold control circuit 12 drives the first tone generating circuit 13, the reception amplifier 6 and the second tone switch circuit 14. The first tone signal from the first tone generating circuit 13 is transmitted to the transmission line 1 through the communication circuit 5, the control circuit 4 and the hook switch 2. The first tone signal is also transmitted to the reception amplifier 6, where it is amplified and the output of the amplifier 6 is converted to a sound by the speaker 7.

On this occasion, the second tone switch circuit 16 is also on. However, since the set time does not arrive, the second sound generating circuit 163 in the microcomputer 16 is not operated and the second tone is not generated.

(2) Operation on arrival of the set time in the hold state

On the arrival of the preset time in the hold state set by the hold control circuit 12, if the present time signal from the clock 160 coincides with the set time signal stored in the memory 161, an instruction signal for generating the second tone is outputted from the comparing circuit 162 to the second tone generating circuit 163. As a result, the second tone generating circuit 163 is turned on and the second tone signal for announcing the arrival of the set time is supplied to the reception amplifier 6. The reception amplifier 6 amplifies the second tone signal together with the first tone signal already supplied thereto for announcing the hold state. Consequently, the second tone is emitted from the speaker 7 in a manner overlapping with the first tone.

(3) Operation for generating the first tone as the time announcing tone

When the set time arrives and the present time signal outputted from the clock 160 coincides with the signal of the set time stored in the memory 161, the comparing circuit 162 outputs an operation instructing signal to the power supply switch circuit 10, the first tone generating circuit 13, the reception amplifier 6 and the second tone generating circuit 163. The reception amplifier 6, the first tone generating circuit 13 and the second tone generating circuit 163 are driven by the internal power supply 9. The first tone signal from the first tone generating circuit 13 is supplied to the reception amplifier 6, where it is amplified, and the first tone signal thus obtained is converted to a sound by the speaker 7. Thus, the first tone is emitted as the time announcing tone, to inform the user of the arrival of the set time.

On this occasion, the second tone generating circuit 163 is also driven but since the hold button 11 is not operated and the hold control circuit 12 holds the second tone switch circuit 14, the second tone is not emitted.

(4) Operation in the case of setting the hold state while the first tone is produced as the time announcing tone on the arrival of the set time When the user operates the hold button 11 to hold the communication with the person on the other side while the first tone is emitted from the speaker 7 on the arrival of the set time during the communication, the hold control circuit 12 turns on the second tone switch circuit 14 and the second tone signal generated in the second tone generating circuit 163 in the microcomputer 16 is inputted to the reception amplifier 6. The reception amplifier 6 amplifies the first tone signal from the first tone generating circuit 13 and the second tone signal inputted from the second tone generating circuit 163 and supplies those signals thus amplified to the speaker 7. The speaker 7 converts the first and second tone signals to sounds.

Consequently, in the telephone system according to the first embodiment, it is possible to reliably inform the user of the arrival of the set time independent of the state of use of the telephone system.

The second tone signal of the second tone generating circuit 163 may be used as a tone for announcing the hold state.

The first tone generating circuit 13 and the second tone generating circuit 163 need to be in a relation in which those circuits can generate tone signals in different manners making it possible to clearly distinguish between the arrival of the set time and the hold state. For this purpose, those tone signals have different frequencies, waveforms or amplitude.

Figure 2:
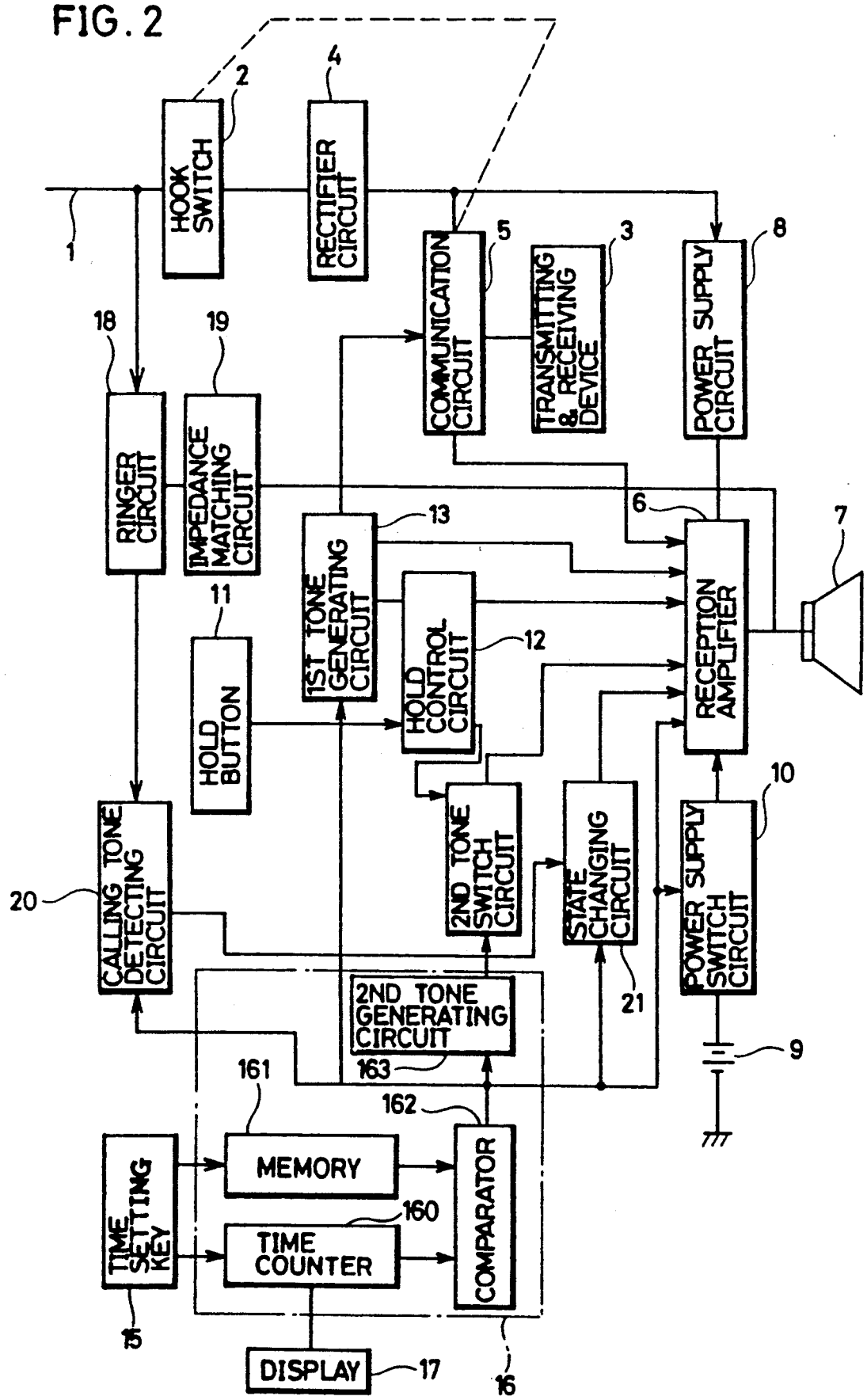
FIG. 2 is a schematic block diagram showing another embodiment of the present invention.
Figure 3:
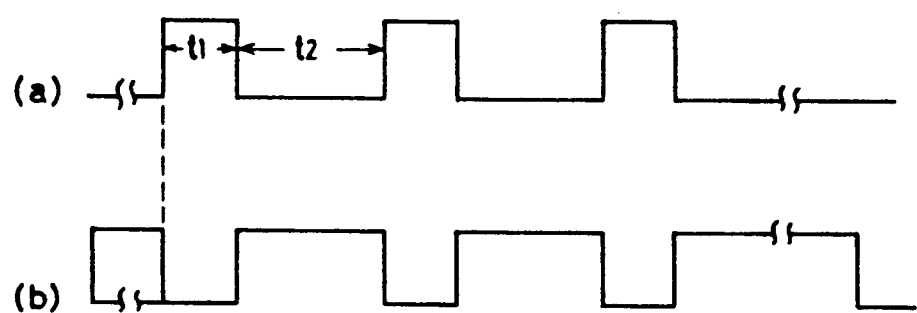
FIG. 3 is a waveform diagram showing changes in states of a call reception signal and a time announcing tone used in the embodiment of FIG. 2.

FIG. 2 is a schematic block diagram showing another embodiment of the present invention. Features different from the embodiment of FIG. 2 are as follows. A calling tone signal detecting circuit 20 is connected to the ringer circuit 18 and a state changing circuit 21 is provided to change a state of the first tone as the time announcing tone in response to an output of the calling tone signal detecting circuit 20. The calling tone signal detecting circuit and the state changing circuit 21 are enabled by the microcomputer 16 when the set time arrives. FIG. 3 is a diagram showing an output waveform of the calling tone signal detecting circuit 20 and levels of the tones outputted from the speaker 7 in the embodiment shown in FIG. 2.

FIG. 3 (a) shows a waveform of the detection output a from the calling tone signal detecting circuit 20, and FIG. 3 (b) shows the level b of the tone outputted from the speaker 7.

Referring to FIGS. 2 and 3, the operation of the embodiment of FIG. 2 will be described. According to this embodiment, the calling tone signal detecting circuit 20 and the state changing circuit 21 are not enabled until the arrival of the set time and accordingly the same operation as in the embodiment shown in FIG. 1 is performed. Therefore, the following description is related with only the case in which a call is received while the first tone is emitted as the time announcing tone.

On the arrival of the set time, a signal is outputted from the comparing circuit 162 contained in the microcomputer 16 so that the calling tone signal detecting circuit 20, the state changing circuit 21 and the first tone generating circuit 13 are enabled. However, since a call reception signal is not supplied from the transmission line 1, a time announcing tone is emitted from the speaker 7 based on the first tone signal from the first tone generating circuit 13 in the same manner as described above in the embodiment of FIG. 1.

Then, when a call is received while the time announcing tone is emitted, the call reception signal is supplied to the ringer circuit 18 through the transmission line 1 and the ringer circuit 18 supplies a calling tone signal at prescribed time intervals to the speaker 7 through the impedance matching circuit 19 in response to the call reception signal. The calling tone signal is also supplied to the calling tone signal detecting circuit 20 and the calling tone signal detecting circuit 20 outputs a pulse signal a at time intervals corresponding to the on time and the off time of the calling tone signal.

The state changing circuit 21 generates a signal for controlling the output of the reception amplifier 6 in response to the pulse signal a. More specifically, when the pulse signal a is at high level, the output of the reception amplifier 6 is stopped. When the pulse signal a is at low level, the output is maintained at the level of the normal time announcing tone.

Thus, the speaker 7 emits the calling tone obtained by conversion of the calling tone signal when the pulse signal a is at high level, and emits the first tone as the time announcing tone when the pulse signal a is at low level.

Thus, when a call is received during the announcement of the time, the time announcing tone and the calling tone are emitted alternately at prescribed intervals, whereby the user can be reliably informed of the reception of the call and the arrival of the set time.

The above described embodiment is related with the case in which the time announcing tone and the calling tone are emitted alternately in response to the pulse signal a. In order to give priority to the announcement of the call reception, a method of lowering the level of the time announcing tone may be used. More specifically, the state changing circuit 21 applies an output signal as a bias voltage to the reception amplifier 6 in response to the output of the calling tone signal detecting circuit 20. The bias voltage makes it possible to reduce the output of the reception amplifier 6.

Consequently, although the time announcing tone and the calling tone are emitted in an overlapping manner, the level of the time announcing tone is lower than that of the calling tone and it is possible to reliably inform the user of the reception of the call and the arrival of the time.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A telephone system connected to a transmission line, having transmission means for transmitting a communication signal to said transmission line and receiving means for receiving the transmission signal from said transmission line, comprising:
   holding means for putting a connection with said transmission line on hold by setting a hold state,
   means for generating a first tone,
   means for generating a second tone,
   holding tone means, responsive to the hold state, for enabling one of said first tone generating means or said second tone generating means for announcing the hold state,
   clock means for measuring and displaying a present time,
   means for setting a desired time,
   comparing means for comparing said desired time and the present time of said clock means and providing an output of comparison indicating arrival of the set time,
   time announcing tone means responsive to the output of comparison of said comparing means for enabling one of said first tone generating means or said second tone generating means,
   means for determining that the arrival of the set time happens during the hold state set by said holding means or that the hold state is set by said holding means during the enablement of a tone by said time announcing means, and
   means responsive to the output of determination of said determining means for enabling the other one of said first and second tone generating means so that both generating means are enabled.

2. A telephone system in accordance with claim 1, wherein the first and second tones generated from said first and second tone generating means are different in any of frequencies, waveforms and amplitudes.

3. A telephone system in accordance with claim 1, wherein said first and second tone generating means comprise a first tone signal generating circuit and a second tone signal generating circuit, respectively, and said first and second tone generating circuits are connected to common electric sound means.

4. A telephone system in accordance with claim 1, further comprising:
   means for generating a third tone in response to reception of a call from said transmission line,
   means for determining that the arrival of the set time happens when the third tone is being generated by said third tone generating means, and
   means responsive to the determination of said determining means for periodically stopping output of either the first tone or the second tone.

5. A telephone system connected to a transmission line, having transmitting means for transmitting a communication signal to said transmission line and receiving means for receiving the transmission signal from said transmission line, comprising:
   means for generating a first tone,
   means for generating a second tone,
   clock means for measuring and displaying a present time,
   means for setting a desired time,
   comparing means for comparing the time set by said time setting means and the present time of said clock means and providing an output of comparison indicating arrival of the set time,
   means responsive to the output of comparison of said comparing means for enabling one of said first tone generating means or said second tone generating means,
   means responsive to the reception of a call from said transmission line for enabling the other one of said first and second tone generating means, and
   means responsive to the output of comparison of said comparing means and the enabled state of the other one of said first and second tone generating means for periodically stopping output of said one of said first tone or said second tone enabled by said comparing means.

* * * * *